(12) United States Patent
Fenske (10) Patent No.: US 12,025,166 B2
(45) Date of Patent: Jul. 2, 2024

(54) SELF-LOCKING PIN

(71) Applicant: GREENLEE TOOLS, INC., Rockford, IL (US)

(72) Inventor: John Russell Fenske, Machesney Park, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 818 days.

(21) Appl. No.: 16/919,147

(22) Filed: Jul. 2, 2020

(65) Prior Publication Data

US 2022/0003258 A1   Jan. 6, 2022

(51) Int. Cl.
*F16B 19/10* (2006.01)
*F16B 21/16* (2006.01)

(52) U.S. Cl.
CPC .......... *F16B 21/165* (2013.01); *F16B 19/109* (2013.01)

(58) Field of Classification Search
CPC .... F16B 21/165; F16B 19/109; F16B 21/125; Y10T 16/553; Y10T 16/5535; Y10T 16/557
USPC ................................. 411/348, 347; 280/515
See application file for complete search history.

(56) References Cited

U.S. PATENT DOCUMENTS

| | | | | |
|---|---|---|---|---|
| 1,655,750 A | * | 1/1928 | Campo .................. | B61H 13/36 411/347 |
| 2,132,284 A | * | 10/1938 | Bonham ............. | F16B 13/0808 411/342 |
| 2,426,099 A | * | 8/1947 | Hershowitz ........... | F16B 45/035 411/347 |
| 2,568,694 A | * | 9/1951 | Bachli .................... | B21D 7/063 72/459 |
| 2,775,154 A | * | 12/1956 | Leaphart, Sr. .......... | F16B 21/10 411/341 |
| 3,097,559 A | | 7/1963 | Chapman | |

(Continued)

FOREIGN PATENT DOCUMENTS

| | | | | |
|---|---|---|---|---|
| GB | 2443269 A | * | 4/2008 | ............... B60D 1/02 |
| GB | 2457451 A | * | 8/2009 | ......... E05B 65/0021 |

OTHER PUBLICATIONS

Specification Sheet for GN 114.2 Locking Pins With Axial Lock (Pawl), Otto Ganter GmbH & Co. KG, 2020, https://www.ganternorm.com/en/products/3.1-Indexing-locking-blocking-with-pins-and-ball-shaped-elements/Locking-pins-with-axial-lock/GN-114.2-Locking-pins-with-axial-lock-Steel, 4 pages.

(Continued)

*Primary Examiner* — William D Hutton, Jr.
*Assistant Examiner* — Dil K. Magar
(74) *Attorney, Agent, or Firm* — Klintworth & Rozenblat IP LLP (57) ABSTRACT

In an embodiment, a self-locking pin includes a cylindrical shaft having a slot at a front end, an enlarged head at the rear end of the shaft, first and second toggles mounted within the slot, a compressible biasing member mounted between the toggles, and a mounting pin extending through the shaft and the toggles. The mounting pin is fixed in position on the shaft and the toggles are movable relative to the mounting pin. Each toggle is movable from a first position in which the respective toggle extending outwardly from an open end of the slot to a second position in which each toggle is pushed inwardly into the slot. The biasing member is compressed when the toggles are in the second positions. A single toggle can also be provided.

26 Claims, 10 Drawing Sheets

(56) References Cited

U.S. PATENT DOCUMENTS

| | | | | |
|---|---|---|---|---|
| 3,476,007 A | * | 11/1969 | Collister | F16B 13/0808 411/345 |
| 3,514,819 A | * | 6/1970 | Hickman | F16B 21/086 24/627 |
| 3,645,160 A | * | 2/1972 | Artioli | F16B 21/125 411/347 |
| 3,673,910 A | * | 7/1972 | Collister | F16B 21/12 411/345 |
| 3,861,267 A | * | 1/1975 | Collister | F16B 41/002 411/345 |
| 4,553,890 A | * | 11/1985 | Gulistan | F16B 5/0208 411/347 |
| 4,581,958 A | * | 4/1986 | Shull | B25G 1/043 81/177.2 |
| 4,658,481 A | * | 4/1987 | Seyler | F16B 21/125 292/307 R |
| 5,148,695 A | * | 9/1992 | Ellis | B21D 7/063 72/149 |
| 5,507,611 A | * | 4/1996 | Collister | F16B 13/0808 411/340 |
| 6,035,505 A | * | 3/2000 | Gmeilbauer | B25B 31/005 269/254 R |
| 6,058,813 A | * | 5/2000 | Bryant | B25B 13/02 81/124.2 |
| 6,709,212 B1 | * | 3/2004 | Lauchner | F16B 37/043 411/551 |
| 6,752,562 B2 | * | 6/2004 | Mills | F16B 19/109 403/321 |
| 6,872,039 B2 | * | 3/2005 | Baus | F16B 19/109 411/347 |
| 7,147,420 B2 | | 12/2006 | Baus et al. | |
| 7,393,168 B2 | * | 7/2008 | Wei | F16B 21/02 411/21 |
| 8,727,276 B2 | * | 5/2014 | Affre De Saint Rome | B64F 1/125 114/294 |
| D949,064 S | * | 4/2022 | Kyeong | B60D 1/60 D12/162 |
| 2003/0213279 A1 | * | 11/2003 | Henden | B21D 11/18 72/383 |
| 2004/0069043 A1 | * | 4/2004 | Bates | B21D 7/063 72/459 |
| 2004/0218992 A1 | * | 11/2004 | Baus | F16B 21/125 411/347 |
| 2006/0182514 A1 | * | 8/2006 | Ito | F16B 5/02 411/340 |
| 2008/0003077 A1 | * | 1/2008 | Anderson | F16B 19/109 411/347 |
| 2010/0038401 A1 | * | 2/2010 | Milliman | A61B 17/1114 227/175.1 |
| 2010/0207360 A1 | * | 8/2010 | Columbia | B60D 1/06 280/515 |
| 2012/0051835 A1 | | 3/2012 | Taylor et al. | |
| 2012/0256393 A1 | * | 10/2012 | Smoot | B60D 1/025 280/515 |
| 2015/0093191 A1 | * | 4/2015 | Vandergeest | F16B 2/14 403/374.5 |
| 2017/0363135 A1 | * | 12/2017 | Apostolopoulos | F16B 37/12 |
| 2018/0272404 A1 | * | 9/2018 | Williams | B21D 7/063 |
| 2019/0111236 A1 | * | 4/2019 | Oliverius | A61M 25/0136 |
| 2020/0362892 A1 | * | 11/2020 | Vandergeest | F16B 13/0808 |
| 2022/0056939 A1 | * | 2/2022 | Baus | F16B 21/125 |

OTHER PUBLICATIONS

Specification Sheet for GN 214.2 Locking Pins With Axial Lock (Pawl), Otto Ganter GmbH & Co. KG, 2020, https://www.ganternorm.com/en/products/3.1-Indexing-locking-blocking-with-pins-and-ball-shaped-elements/Locking-pins-with-axial-lock/GN-214.2-Locking-pins-with-axial-lock-Pawl, 4 pages.

* cited by examiner

SELF-LOCKING PIN

FIELD OF THE DISCLOSURE

The present disclosure relates to a self-locking pin for use in fastening components together. In particular, the present disclosure relates to a self-locking pin for use in fastening a saddle to a bending shoe of a bender which bends a conduit, or a bending shoe to a yoke of a bender which bends a conduit.

BACKGROUND

Self-locking pins are known in the art. Examples of such self-locking pins are provided in U.S. Pat. Nos. 3,097,559, 6,872,039, and United States Publication US 2012/0051835.

SUMMARY

A self-locking pin in accordance with example embodiments is provided for fastening components together. In particular, the present disclosure relates to a self-locking pin for use in fastening a saddle to a shoe of a conduit bender, or a bending shoe to a yoke of a conduit bender.

In an embodiment, a self-locking pin includes a cylindrical shaft having a slot at a front end thereof which forms opposite first and second open ends on an outer surface of the shaft, an enlarged head at the rear end of the shaft, first and second toggles mounted within the slot, a compressible biasing member mounted between the toggles, and a mounting pin extending through the shaft and the toggles. The mounting pin is fixed in position on the shaft and the toggles are movable relative to the mounting pin. Each toggle is movable from a first position to a second position. The first toggle extends partially outwardly from the first open end of the slot in its first position and the second toggle extends partially outwardly from the second open end of the slot in its first position. Each toggle is pushed inwardly into the slot in the second position. The biasing member is expanded when the toggles are in the first positions and is compressed when the toggles are in the second positions.

In an embodiment, a self-locking pin includes a cylindrical shaft having a slot therein which forms an open end on an outer surface of the shaft, an enlarged head at the rear end of the shaft, a single toggle mounted within the slot, a compressible biasing member mounted between the toggle and the shaft, and a mounting pin extending through the shaft and the toggle. The mounting pin is fixed in position on the shaft and the toggle is movable relative to the mounting pin. The toggle is movable from a first position to a second position. The toggle extends partially outwardly from the open end of the slot in its first position and is pushed inwardly into the slot in the second position. The biasing member is expanded when the toggle is in the first position and is compressed when the toggle is in the second position.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 6:
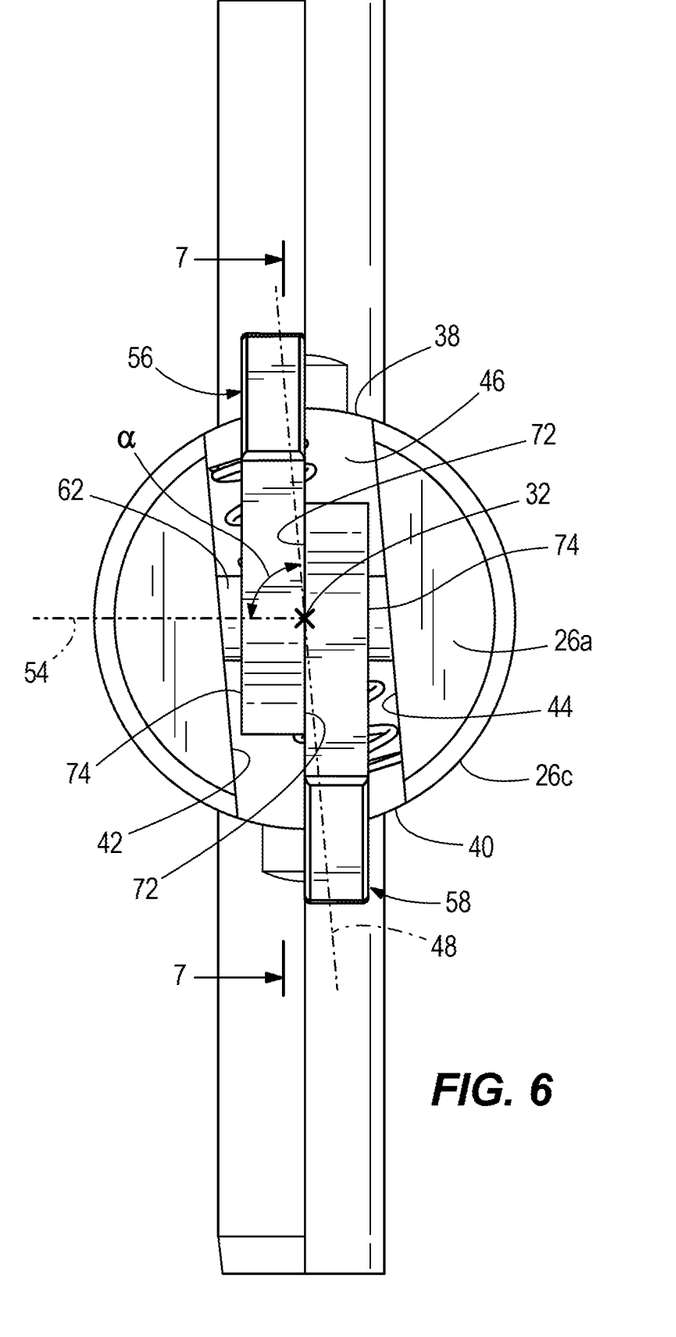
FIG. 6 depicts an end elevation view of the self-locking pin of FIG. 1.
Figure 7:
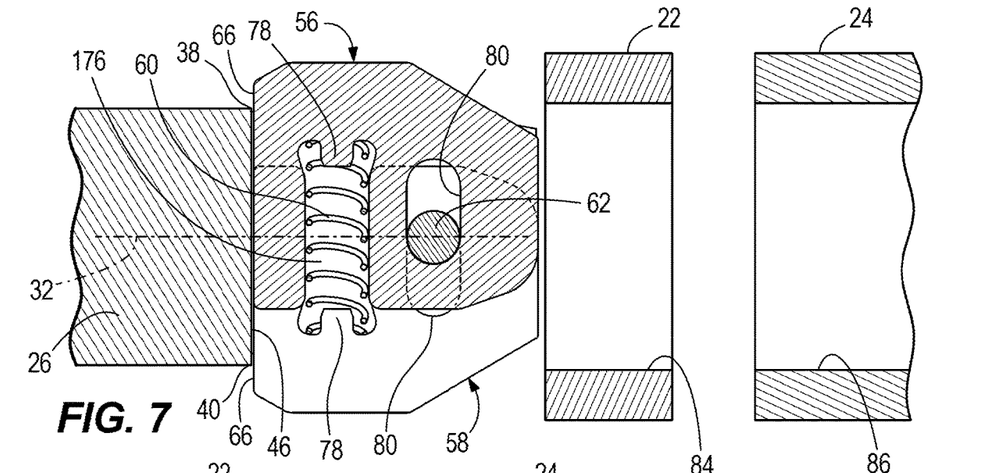
FIG. 7 depicts a partial cross-sectional view of the self-locking pin along line 7-7 of FIG. 6 and showing components in cross-section into which the self-locking pin is inserted.
Figure 8:
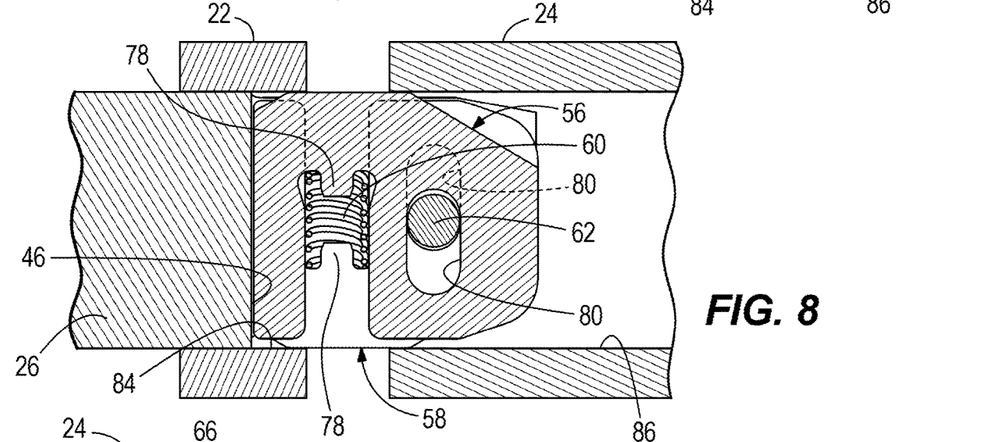
FIGS. 8 and 9 depict partial cross-sectional views of the self-locking pin and components in various states of assembly.
Figure 9:
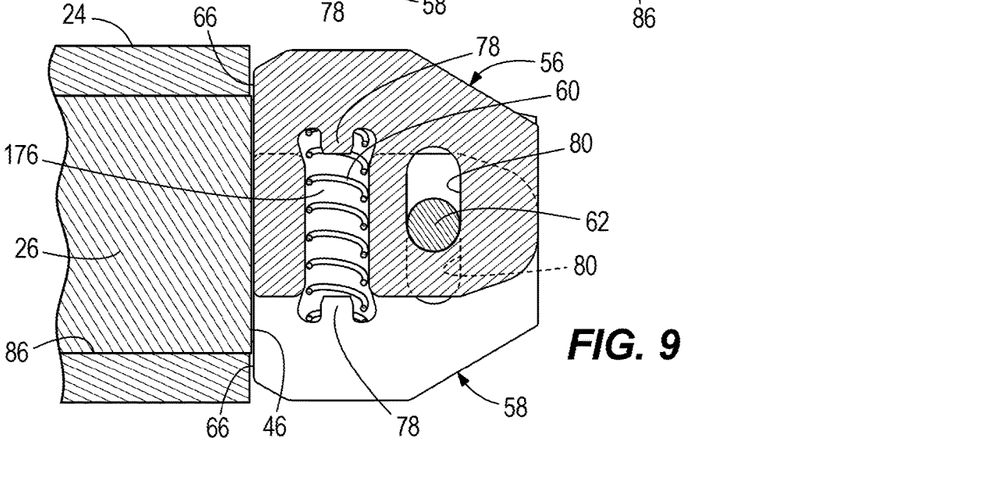
Figure 10:
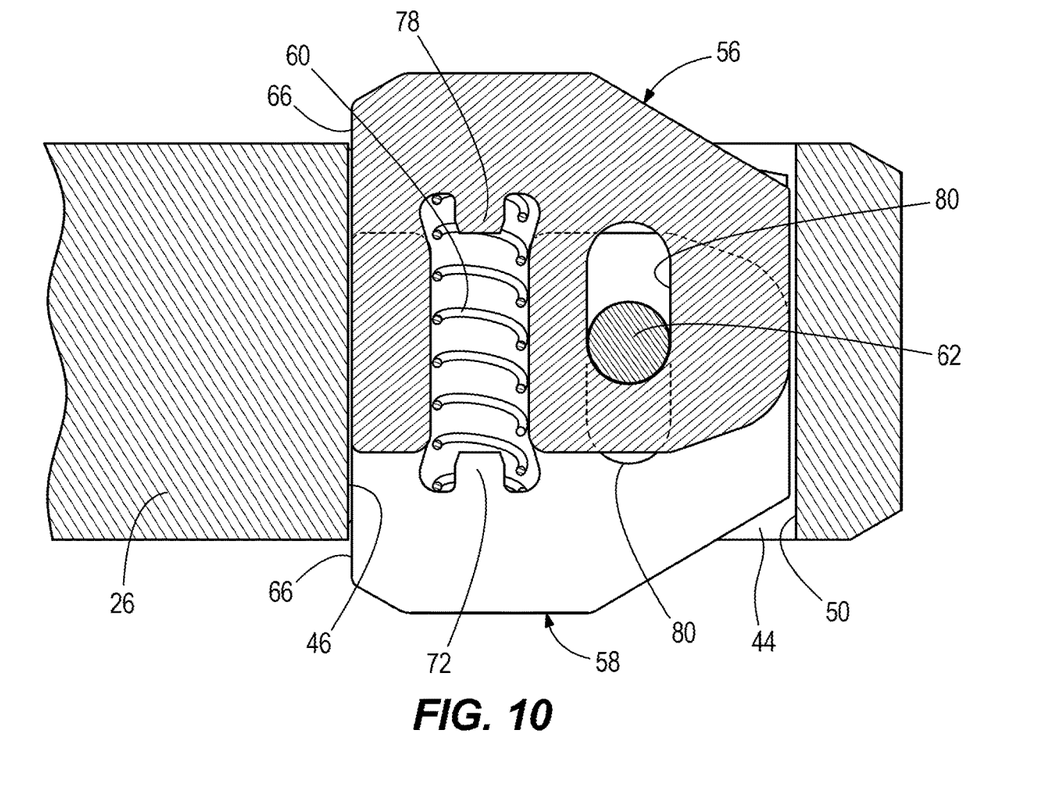
FIG. 10 depicts a cross-sectional view of a modified self-locking pin.
Figure 11:
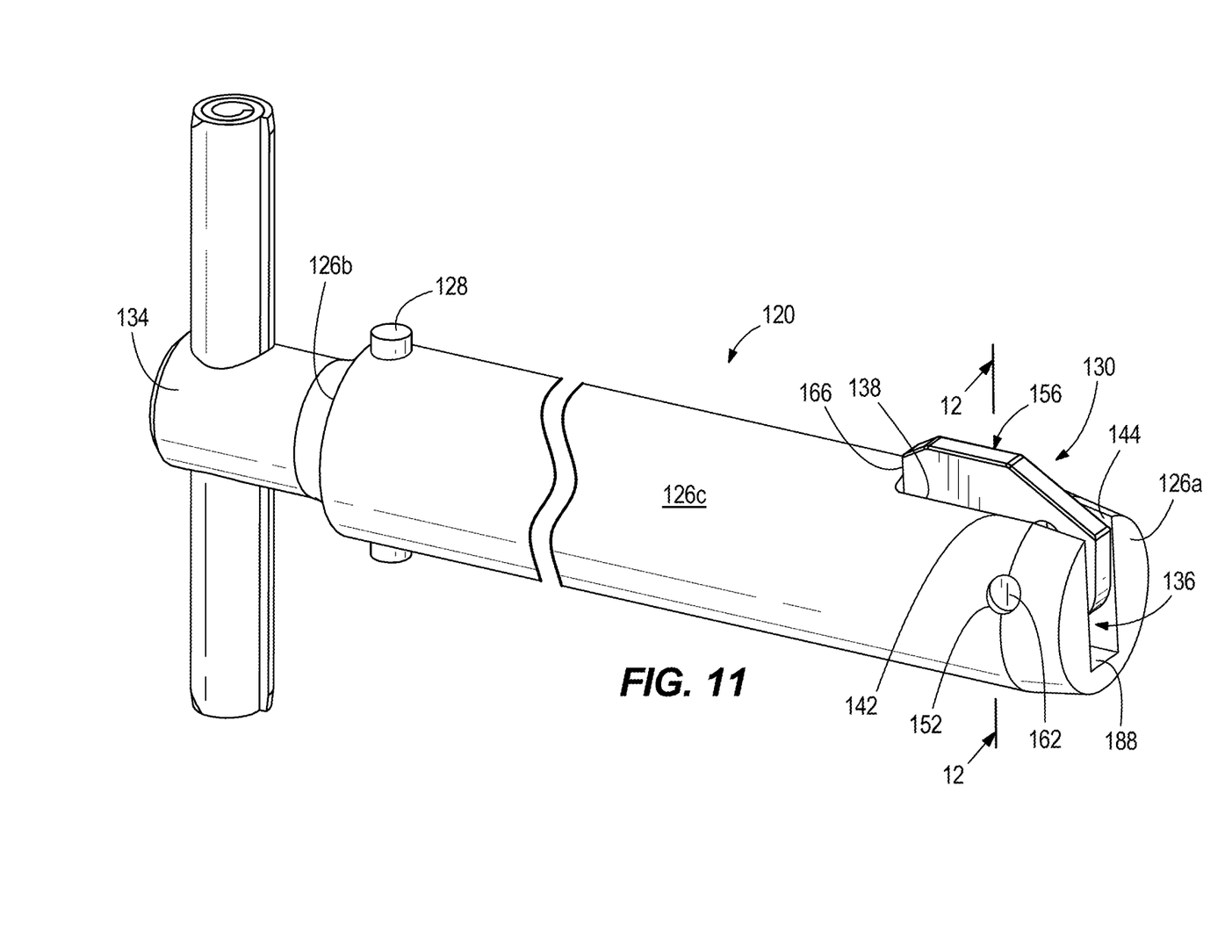
FIG. 11 depicts a perspective view of a self-locking pin in accordance with another embodiment of the present disclosure.
Figure 12:
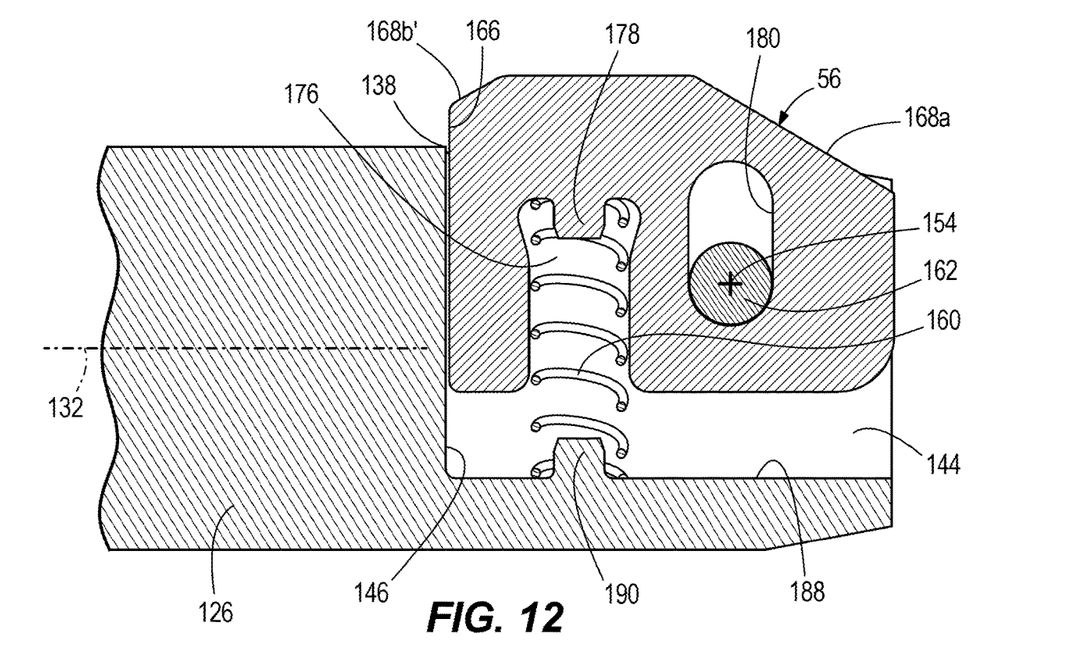
FIG. 12 depicts a partial cross-sectional view of the self-locking pin of FIG. 11.
Figure 13:
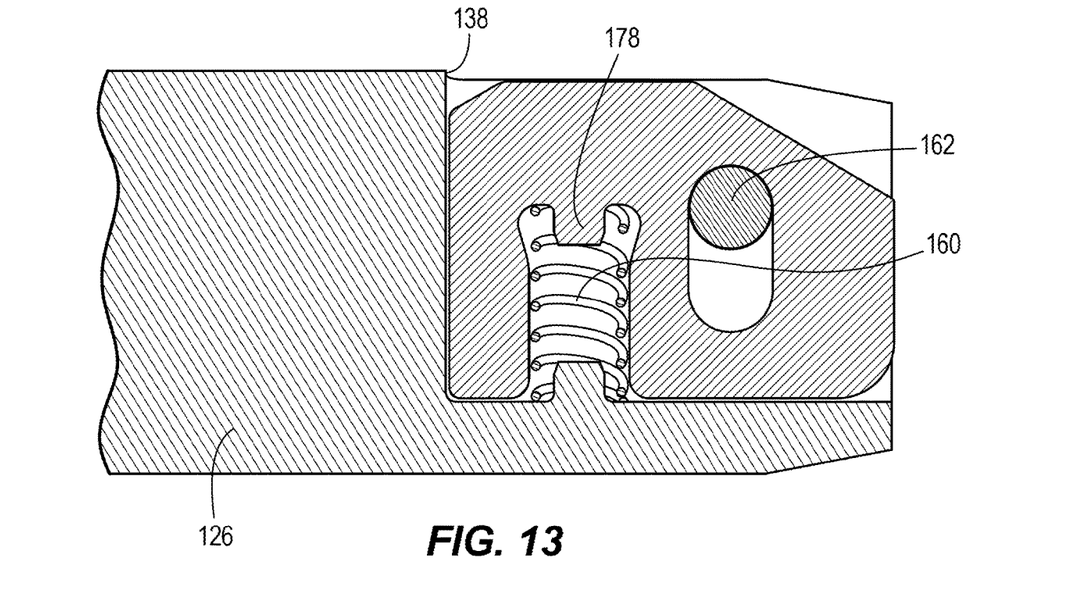
FIG. 13 depicts a partial cross-sectional view of the self-locking pin of FIG. 11 in a second position.

A self-locking pin 20, 120 is provided for fastening a first component 22 to a second component 24, see FIGS. 7 and 8. The self-locking pin 20, 120 is releasable from the components 22, 24 to allow the components 22, 24 to be separated. A first embodiment of the pin 20 is shown in FIGS. 1-10 and a second embodiment of the pin 120 is shown in FIGS. 11-13.

Attention is invited to the first embodiment of the self-locking pin 20 shown in FIGS. 1-10. The self-locking pin 20 includes a generally cylindrical shaft 26 having opposite front and rear ends 26a, 26b, an enlarged head 28, 28' at the rear end 26b thereof, and a toggle assembly 30 at the front end thereof 26a. A longitudinal central axis 32 of the shaft 26 extends between the front and rear ends 26a, 26b.

Figures 1, 2:
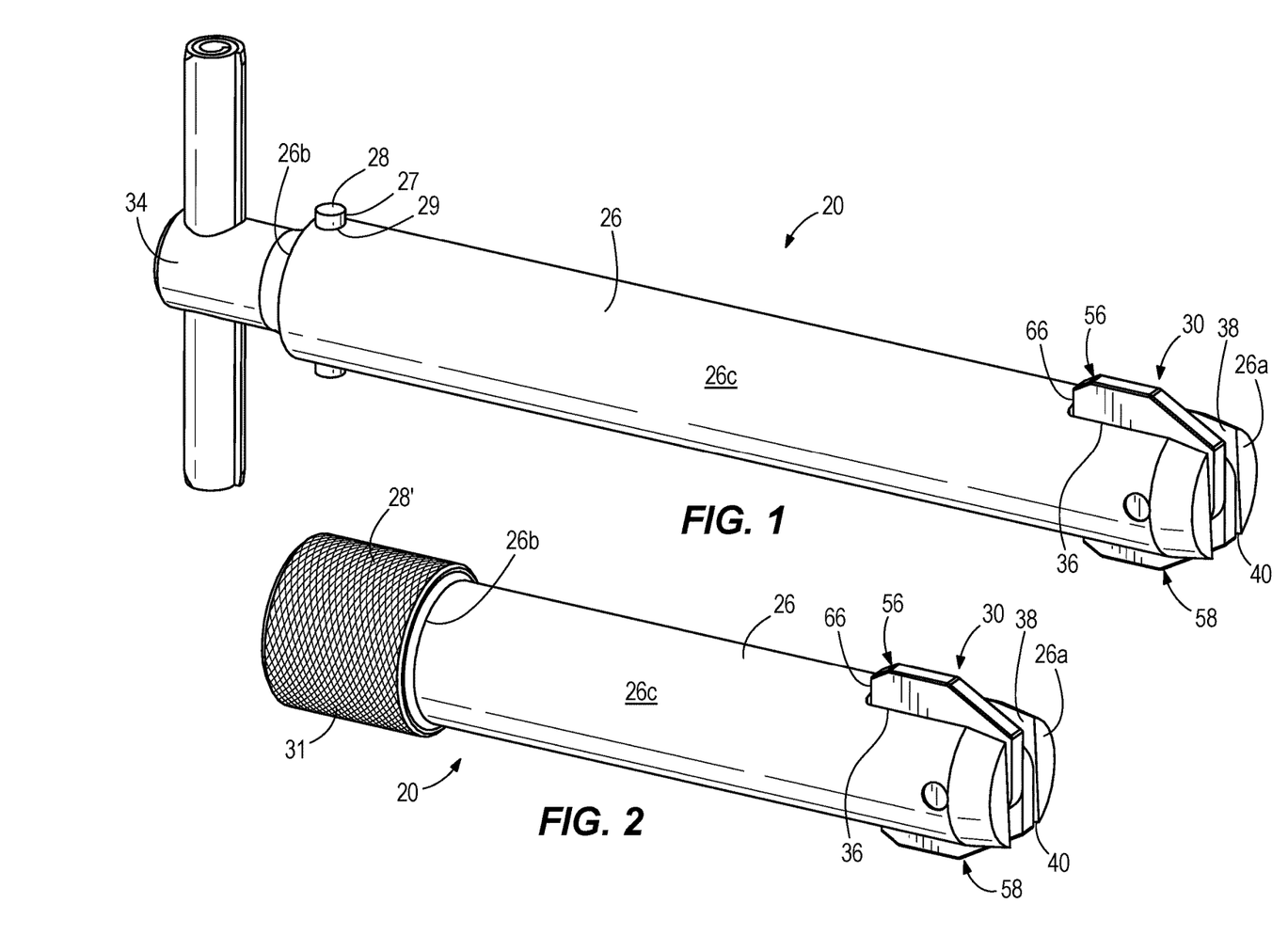
FIG. 1 depicts a perspective view of a self-locking pin in accordance with an embodiment of the present disclosure.
FIG. 2 depicts a perspective view of an alternate self-locking pin in accordance with an embodiment of the present disclosure.

In an embodiment as shown in FIG. 1, the enlarged head 28 is formed by a pair of projections which extend radially outward from an outer surface 26c of the shaft 26. An example of the pair of projections may be formed by a pin 27 being inserted into an aperture 29 extending radially or diametrically through the shaft 26 proximate the rear end 26b. In this embodiment, the self-locking pin 20 may further include a handle 34 at the rear end 26b of shaft 26 which is spaced from the enlarged head 28. The handle 34 provides a means for an operator to easily grasp the self-locking pin 20 at the rear end 26b thereof. In an embodiment as shown in FIG. 2, the enlarged head 28' is formed by a cylindrical member having an outer surface that forms a diameter that is greater than the diameter of the outer surface 26c of the shaft 26. As shown in FIG. 2, the enlarged head 28' has knurling section 31 thereon which provides a means for an operator to easily grasp the self-locking pin 20 at the rear end 26b thereof.

An elongated slot 36 extends diametrically through the shaft 26 at the first end 26a thereof and forms first and second diametrically opposed open ends 38, 40, see FIGS. 1 and 6, on the outer surface 26c of the shaft 26. In the embodiment shown in FIGS. 1-8, the slot 36 is open to the front end 26a of the shaft 26 along the longitudinal central axis 32 and has first and second planar side walls 42, 44 which extend longitudinally from the front end 26a to a planar end wall 46. The side walls 42, 44 are parallel to each other and the end wall 46 is perpendicular to the side walls 42, 44. A length of the slot 36 is defined between the front end 26a of the shaft 26 and the end wall 46. A central axis 48 of the slot 36 is defined between the open ends 38, 40 and is transverse to the longitudinal central axis 32 of the shaft 26. Alternatively as shown in FIG. 10, the slot 36 has a closed front end which is formed by a planar front end wall 50 at the opposite ends of the side walls 42, 44, such that a length of the slot 36 is defined between the front end wall 50 and the end wall 46. The front end 26a may be chamfered.

Figure 3:
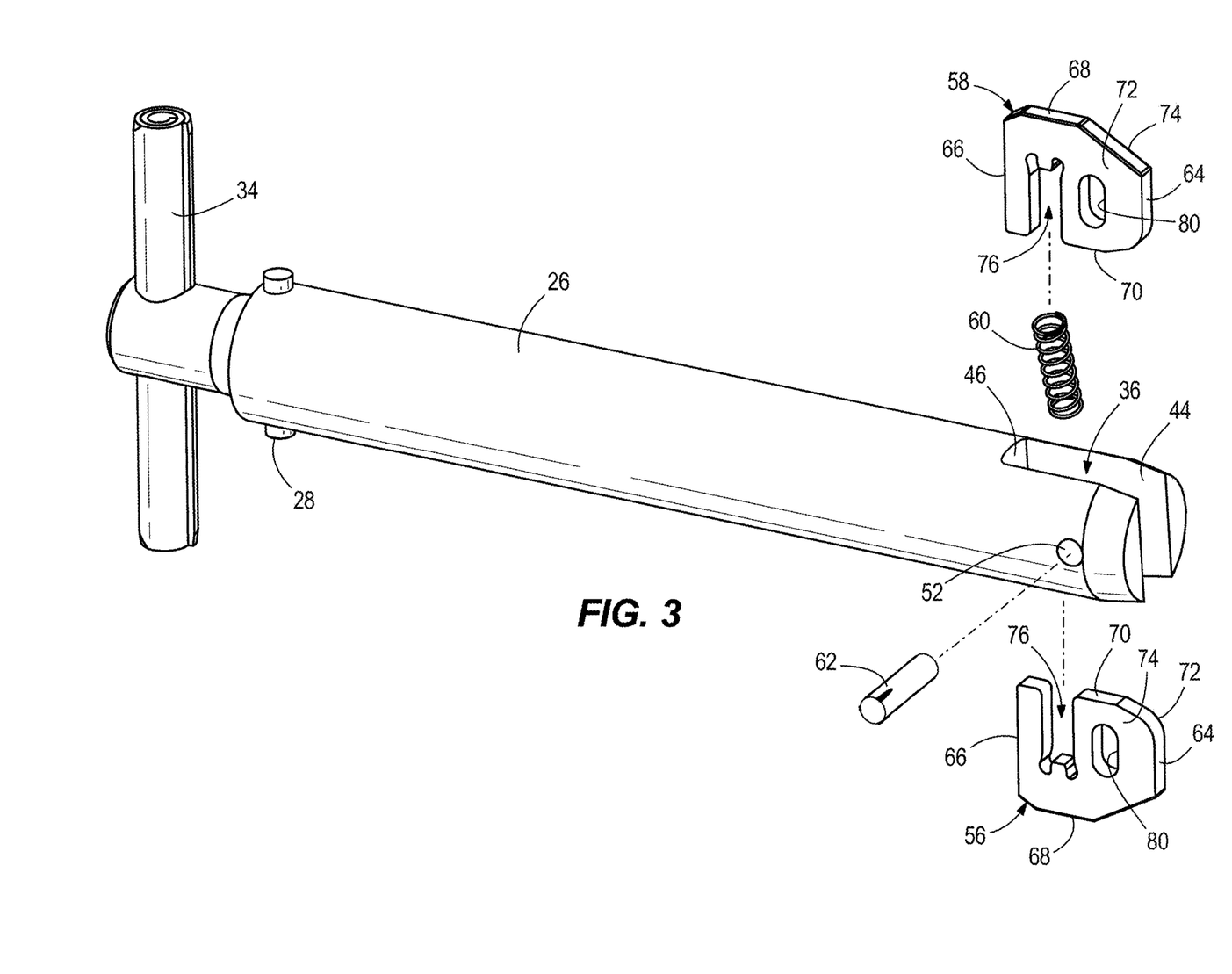
FIG. 3 depicts an exploded perspective view of the self-locking pin of FIG. 1.

A bore 52, see FIG. 3, extends diametrically through the shaft 26, and extends through the slot 36. A central axis 54 is defined by the bore 52 which is transverse to the central axis 32. The central axis 54 may fall along the longitudinal central axis 32.

The central axis 48 of the slot 36 and the central axis 54 of the bore 52 are angled relative to each other at an angle α of less than or equal to 90 degrees as shown in FIG. 6. In an embodiment, the angle α is 85 degrees. In an embodiment, the angle α is between 60 degrees and 90 degrees.

As best shown in FIG. 3, the toggle assembly 30 includes first and second toggles 56, 58 which seat side-by-side within the slot 36, a compressible biasing member 60 mounted between the toggles 56, 58, and a mounting pin 62.

Figure 4:
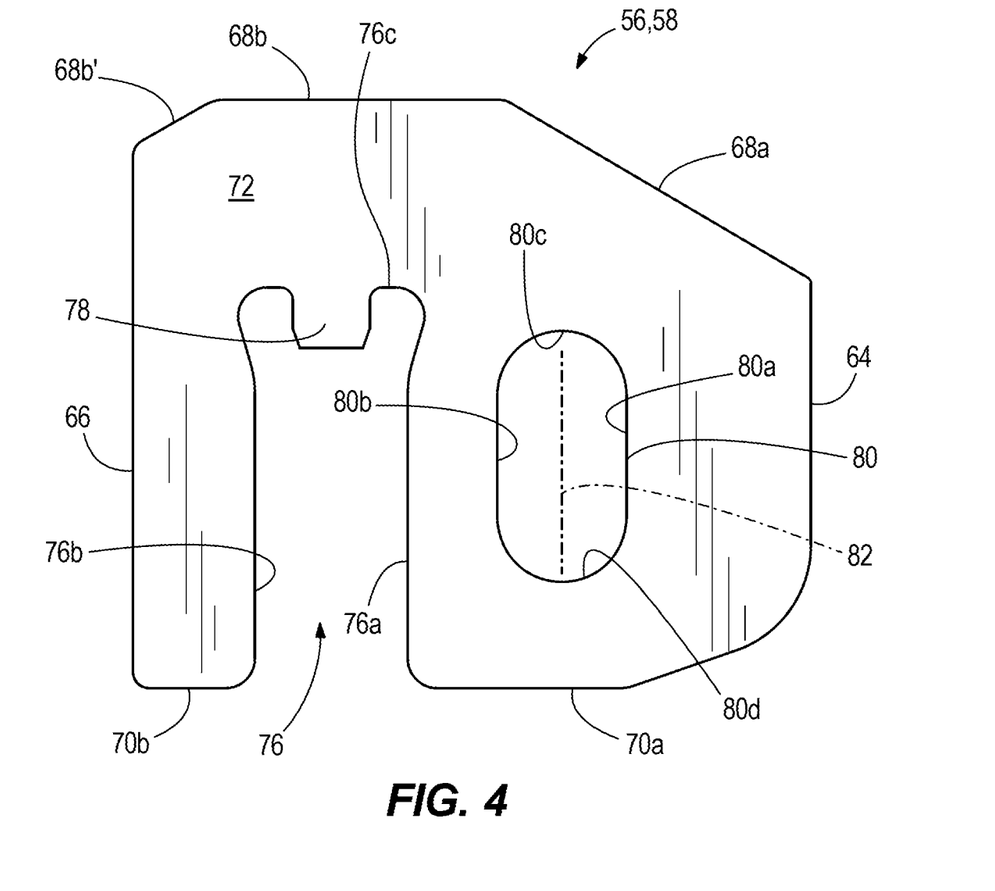
FIG. 4 depicts an elevation view of a toggle of the self-locking pin.
Figure 5:
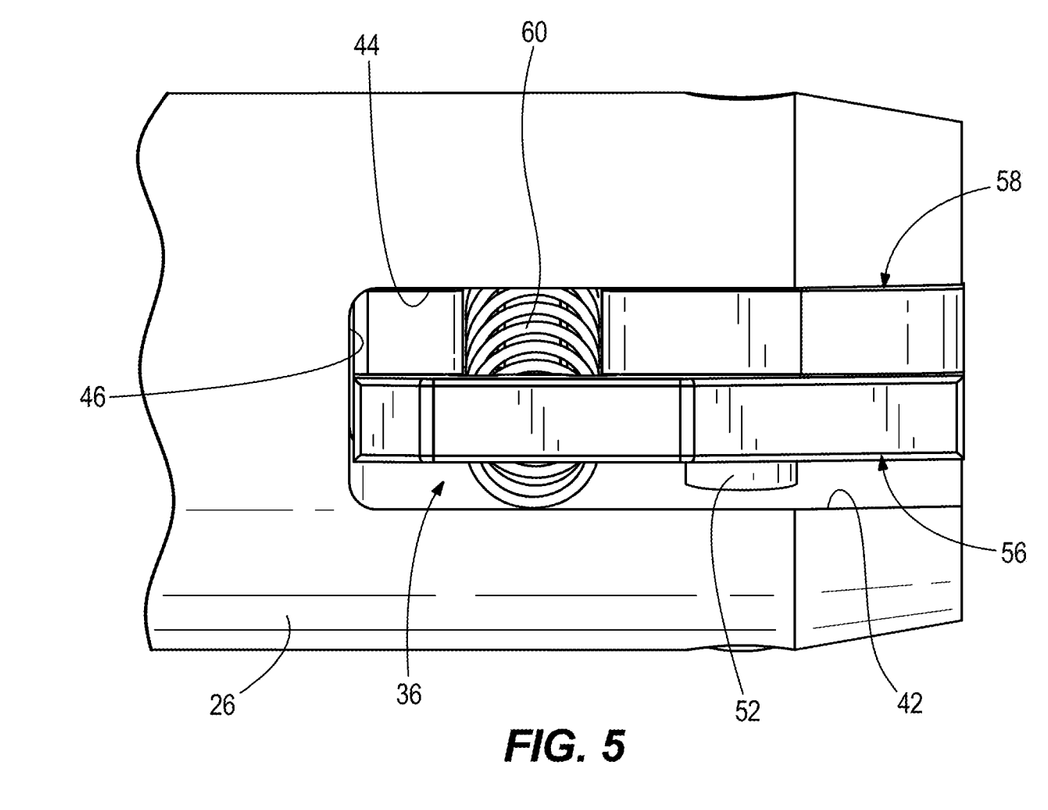
FIG. 5 depicts a partial elevation view of the self-locking pin.

The toggles 56, 58 may be identically formed. Each toggle 56, 58 may be formed of a steel, and may be laser or water jet cut out of steel plate to reduce costs of manufacture. As shown in FIGS. 3 and 4, each toggle 56, 58 has a front surface 64, a rear surface 66, an outer surface 68, an inner surface 70, and planar side surfaces 72, 74 extending between the surfaces 64, 66, 68, 70. The front and rear surfaces 64, 66 define a length of each toggle 56, 58. The front and rear surfaces 64, 66 may be parallel to each other, or may be angled relative to each other. The length of each toggle 56, 58 may be less than the length of the slot 36. The outer surface 68 has a front portion 68a which extends outwardly and at an angle from the front surface 64 and a rear portion 68b which is perpendicular to the front and rear surfaces 64, 66. The rear portion 68b may include an angled portion 68b' extending from the rear surface 66. The front portion 68a forms a chamfer to aid in assembly of the self-locking pin 20. The inner surface 70 has front and rear portions 70a, 70b and a pocket 76 extending therefrom toward the outer surface 68. In an embodiment, the front and rear portions 70a, 70b are perpendicular to the front and rear surfaces 64, 66. The pocket 76 has front and rear planar walls 76a, 76b and an outer wall 76c at outer ends of the walls 76a, 76b. The front and rear walls 76a, 76b are parallel to each other and to the front and rear surfaces 64, 66. A protrusion 78 extends from the outer wall 76c toward the inner surface 70. An elongated mounting pin opening or slot 80 is provided in each toggle 56, 58. In an embodiment, the mounting pin slot 80 is between the pocket 76 and the front surface 64. Alternatively, the positions of the pocket 76 and the mounting pin slot 80 can be flipped. The mounting pin slot 80 has parallel front and rear walls 80a, 80b, and outer and inner walls 80c, 80d extending between the front and rear walls 80a, 80b. The outer and inner walls 80c, 80d may be curved. A centerline 82 is defined along the length of the mounting pin slot 80 between the outer and inner walls 80c, 80d. The centerline 82 is parallel to the front and rear surfaces 64, 66.

The biasing member 60 may be a coil spring or a torsion spring. Other compressible biasing members or members are within the scope of the present disclosure. The biasing member 60 seats within the pockets 76 of the toggles 56, 58 and has its opposite ends seating over the protrusions 78.

The mounting pin 62 may be a solid dowel pin. The mounting pin 62 extends through the bore 52 and through the mounting pin slots 80 of the toggles 56, 58 as described herein, and is affixed to the shaft 26.

To assemble the toggle assembly 30 with the shaft 26, the ends of the biasing member 60 are seated over the protrusions 78 and the toggles 56, 58 are placed side-by-side with their outer surfaces 68 facing away from each other and side surfaces 72 are proximate to each other. The toggles 56, 58 partially overlap each other such that a portion of each mounting pin slot 80 aligns. The assembled toggles 56, 58 and the biasing member 60 are then inserted into the slot 36. The aligned portions of the elongated mounting pin slot 80 aligned with the bore 52. Since the central axis 48 of the slot 36 is angled relative to the central axis 54 is defined by the bore 52, the side surfaces 72, 74 of the toggles 56, 58 are not parallel to the side walls 42, 44 of the slot 36 as shown in FIG. 6. Thereafter, the mounting pin 62 is inserted through the bore 52 and through the aligned portions of the elongated mounting pin slots 80 and affixed to the shaft 26. The toggles 56, 58 extend in the radial direction relative to the longitudinal central axis 32 of the shaft 26 when seated in the slot 36. The mounting pin 62 can be affixed to the shaft 26 in a number of ways. For example, but not limited to, the mounting pin 62 can be press fit into the shaft 26, can have a head at one end and be fastened to the shaft 26 by a nut at the other end (the head and nut may be seated within counterbores in the shaft 26), and the like. The engagement of the mounting pin 62 with the toggles 56, 58 and the engagement of the toggles 56, 58 with the end wall 46 of the slot 36 maintains the longitudinal positions of the toggles 56, 58 relative to the shaft 26. The toggles 56, 58 can move in a generally lateral direction relative to the shaft 26.

The biasing member 60 biases the toggles 56, 58 away from each other such that in a first (at-rest) position, toggle 56 extends partially out of open end 38 and toggle 58 extends partially out of open end 40, see FIGS. 6 and 7. When the self-locking pin 20 is inserted into an opening 84 through the component 22, the angled surfaces 68a of the toggles 56, 58 engage with the edge of the opening 84 of the component 22. Upon an operator pushing the self-locking pin 20 into the opening 84 in the component 22, the toggles 56, 58 slide relative to each other to move relative to the shaft 26 and the mounting pin 62 and are pushed until the toggles 56, 58 are far enough into the slot 36 and into a second position in which the self-locking pin 20 can be pushed through the openings 84, 86 in both components 22, 24, see FIG. 8. When the toggles 56, 58 are pushed into the slot 36, the biasing member 60 compresses between the toggles 56, 58. The toggles 56, 58 may completely overlap each other in this second position. Since the toggles 56, 58 are not parallel to the central axis 48 of the slot 36, this minimizes binding of the toggles 56, 58 and the biasing member 60 from with the walls 42, 44 of the slot 36. After the toggles 56, 58 are pushed through the openings 84, 86, the biasing member 60 automatically expands to cause the toggles 56, 58 to move outwardly and the rear surfaces 66 of the toggles 56, 58 engage the component 24, see FIG. 9. An audible click may be heard at this point which confirms to the operator that the self-locking pin 20 is in proper position. At this position, the toggle assembly 30 is again in the first (at-rest) position. The components 22, 24 are then positioned between the rear surfaces 66 of the toggles 56, 58 and the enlarged head 28, 28'. The mounting pin 62 limits the amount of movement that the toggles 56, 58 can move inwardly toward each other and can move outwardly away from each other.

The self-locking pin 20 can be easily disengaged from the components 22, 24. To disengage the self-locking pin 20 from the components 22, 24, the operator simply presses on the outer surfaces 68 of the toggles 56, 58 until the toggles 56, 58 are in the second position. The operator then grips the handle 34 or the enlarged head 28, 28' and pulls the self-locking pin 20 out from the components 22, 24. If the angled portion 68b' is provided, this acts as a chamfer to assist in removing the self-locking pin 20 from the components 22, 24. Once the self-locking pin 20 is free from the components 22, 24, the toggle assembly 30 automatically resumes the first (at-rest) position and is ready for re-use.

The length of each toggle 56, 58 may dimensioned to account for any gaps between the components 22, 24. As such, the toggles 56, 58 are always engaged with at least one of the components 22, 24 while being passed through the openings 84, 86.

The shaft 26 may have a first finish and/or color and the toggles 56, 58 have a second finish and/or color which is different from the first finish and/or color to assist in identifying to an operator that the toggles 56, 58 can be actuated. For example, but not limited to, the toggles 56, 58 have a metal plate finish, for example zinc, and the shaft 26 has black oxide is applied thereto.

Attention is invited to the second embodiment of the self-locking pin 120 shown in FIGS. 11-13. Like reference elements are shown with like reference numerals, but in the one hundreds. The self-locking pin 120 includes a generally cylindrical shaft 126 having opposite front and rear ends 126a, 126b, an enlarged head 128 at the rear end 126b thereof, and a toggle assembly 130 at the front end thereof 126a. A longitudinal central axis 132 of the shaft 126 extends between the front and rear ends 126a, 126b.

In an embodiment as shown in FIG. 11, the enlarged head 128 is formed by a pair of projections which extend radially outward from an outer surface 126c of the shaft 126. In this embodiment, the self-locking pin 120 may further include a handle 134 at the rear end 126b of shaft 126 which are spaced from the enlarged head 128. The handle 134 provides a means for an operator to easily grasp the self-locking pin 120 at the rear end 126b thereof. Alternatively (but not shown), the enlarged head 128 may be formed like that shown in FIG. 2.

An elongated slot 136 extends partially through the shaft 126 along the diameter of the shaft 126 at the first end 126a thereof and forms an open end 138 on the outer surface 126c of the shaft 126. In the embodiment shown in FIGS. 11-13, the slot 136 is open to the front end 126a of the shaft 126 along the longitudinal central axis 132 and has first and second planar side walls 142, 144 which extend longitudinally from the front end 126a to a planar end wall 146, and having an inner wall 188 at ends of the side walls 142, 144. The side walls 142, 144 are parallel to each other, the end wall 146 is perpendicular to the side walls 142, 144, and the inner wall 188 is perpendicular to the side walls 142, 144 and to the end wall 146. A protrusion 190 extends from the inner wall 188 toward the open end 138. A length of the slot 136 is defined between the front end 126a of the shaft 126 and the end wall 146. A central axis of the slot 136 is defined between the open end 138 and the inner wall 188 and is transverse to the longitudinal central axis 132. Alternatively, the slot 136 may have a closed front end like that shown in FIG. 10. The front end 126a may be chamfered.

A bore 152 extends diametrically through the shaft 126, and extends through the slot 136. A central axis 154 is defined by the bore 152 which is transverse to the central axis 132 of the shaft 126. The central axis 154 may fall along the longitudinal central axis 132.

Identical to that of the first embodiment, the central axis of the slot 136 and the central axis 154 of the bore 152 are angled relative to each. In an embodiment, the angle is less than or equal to 90 degrees. In an embodiment, the angle is 85 degrees. In an embodiment, the angle is 60 degrees. In an embodiment, the angle is between 60 degrees and 90 degrees.

The toggle assembly 130 includes a single toggle 156, a compressible biasing member 160 mounted between the toggle 156 and the inner wall 188, and a mounting pin 162.

The toggle 156 is identically formed to that of toggle 56 and the specifics are not repeated herein.

The biasing member 160 is identically formed to that of biasing member 60 and the specifics are not repeated herein. The biasing member 160 seats within the pocket 176 of the toggle 156 and has its opposite ends seating over the protrusions 178, 190.

The mounting pin 162 is identically formed to that of mounting pin 62 and is mounted to the shaft 126 in the same manner that mounting pin 62 is mounted to the shaft 26, and the specifics are not repeated herein. The mounting pin 162 extends through the bore 152 and through the mounting pin slot 180 of the toggle 156, and is affixed to the shaft 126 at its opposite ends.

To assemble the toggle assembly 130 with the shaft 126, the end of the biasing member 160 is seated over the protrusion 190, and the toggle 156 is inserted into the slot 136. The elongated mounting pin slot 180 aligns with the bore 152. Thereafter, the mounting pin 162 is inserted through the bore 152 and through the elongated mounting pin slots 180. The toggle 156 extends in the radial direction relative to the longitudinal central axis 132 of the shaft 126 when seated in the slot 136. The engagement of the mounting pin 162 with the toggle 156 and the engagement of the toggle 156 with the end wall 146 of the slot 136 maintains the longitudinal positions of the toggle 156 relative to the shaft 126. The toggle 156 can move in a generally lateral direction relative to the shaft 126.

The biasing member 160 biases the toggle 156 away from the inner wall 188 other such that in a first (at-rest) position, toggle 156 extends partially out of open end 138. When the self-locking pin 120 is inserted into the opening 84 through the component 22, the angled surfaces 168a of the toggle 156 engages with the edge of the opening 84. Upon an operator pushing the self-locking pin 120 into the opening 84 in the component 22, the toggle 156 slides relative to the shaft 126 and the mounting pin 162 until the toggle 156 is far enough into the slot 136 and into a second position in which the self-locking pin 120 can be pushed through the openings 84, 86 in both components 22, 24. When the toggle 156 is pushed into the slot 136, the biasing member 160 compresses between the toggle 156 and the inner wall 188. Since the toggle 156 is not parallel to the central axis of the slot 136, this minimizes binding of the toggle 156 and the biasing member 160 from with the walls 142, 144 of the slot 136. After the toggle 156 is pushed through the openings 84, 86 in the components 22, 24, the biasing member 160 automatically expands to cause the toggle 156 to move outwardly and the rear surface 166 of the toggle 156 engages the component 24. An audible click may be heard at this point which confirms to the operator that the self-locking pin 120 is in proper position. At this position, the toggle assembly 130 is again in the first (at-rest) position. The components 22, 24 are then positioned between the rear surface 166 of the toggle 156 and the enlarged head 128. The mounting pin 162 limits the amount of movement that the toggle 156 can move relative to the shaft 126.

The self-locking pin 120 can be easily disengaged from the components 22, 24 by the operator simply pressing on the outer surface 168 of the toggle 156 until the toggle 156 is in the second position. The operator then grips the handle 134 or the enlarged head 128 and pulls the self-locking pin 120 out from the components 22, 24. If the angled portion 168b' is provided, this acts as a chamfer to assist in removing the self-locking pin 120 from the components. Once the self-locking pin 120 is free from the components 22, 24, the toggle assembly 130 automatically resumes the first (at-rest) position and is ready for re-use.

The length of the toggle 156 may dimensioned to account for any gaps between the components 22, 24. As such, the toggle 156 is always engaged with at least one of the components 22, 24 while being passed through the openings.

The shaft 126 may have a first finish and/or color and the toggle 156 has a second finish and/or color which is different from the first finish and/or color to assist in identifying to an operator that the toggle 156 can be actuated. For example, but not limited to, the toggle 156 has a metal plate finish, for example zinc, and the shaft 126 has black oxide is applied thereto.

Figure 14:
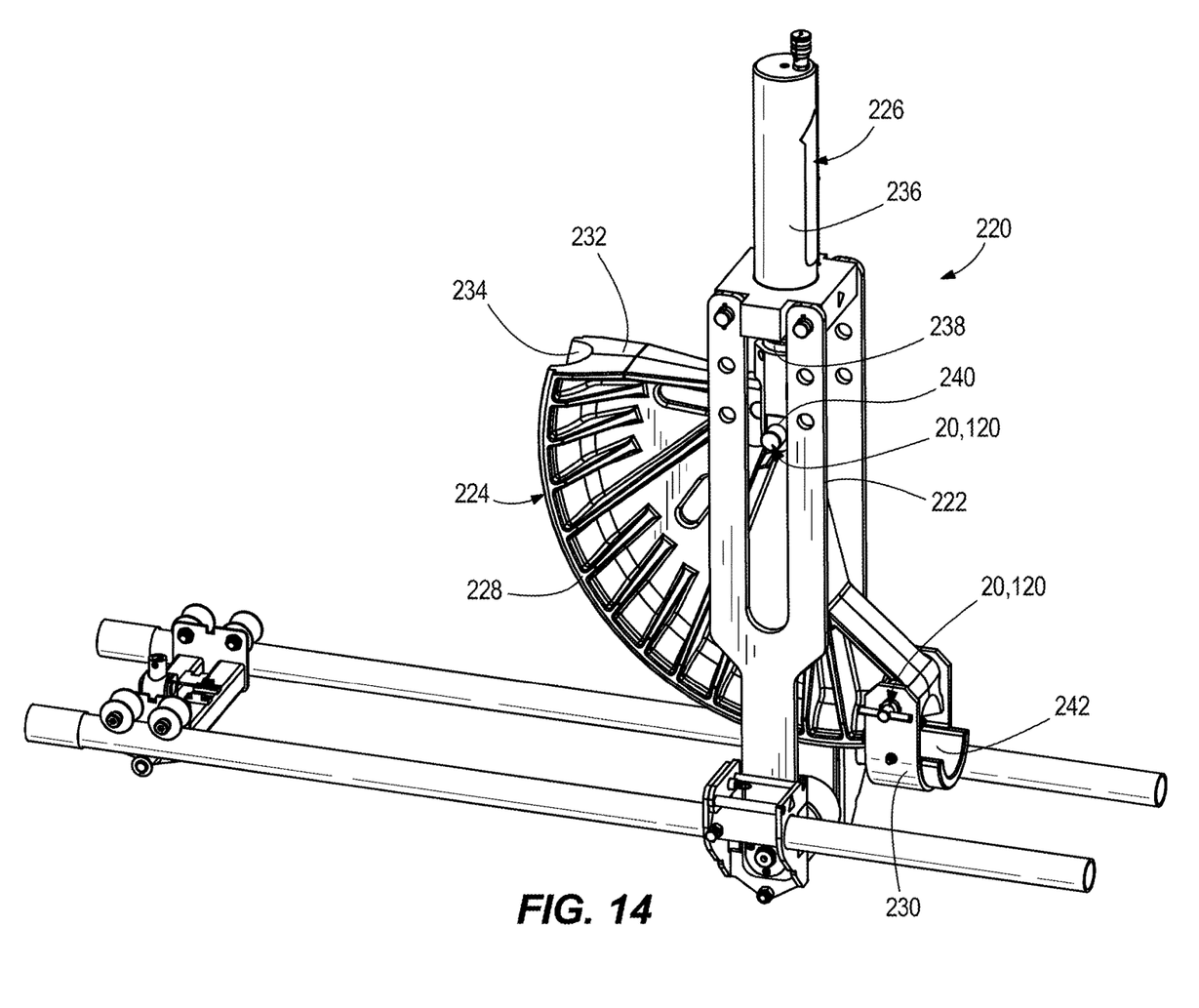
FIG. 14 depicts a perspective view of a conduit bender which has the self-locking pins thereon for attaching components of the conduit bender together.

The self-locking pin 20, 120 may be adapted for use with fastening components together of a conduit bender 220 that bends a conduit (not shown) during a bending operation. FIG. 14 shows an example conduit bender 220 and the present disclosure is not limited to the particular conduit bender 220 shown therein. The bender 220 includes a frame 222, a bending shoe assembly 224 rotatably mounted on the frame 222, a driver 226 for providing rotational force to the bending shoe assembly 224 to perform a conduit bending operation.

The bending shoe assembly 224 includes a bending shoe 228 and a gripping member 230, commonly called a saddle or a hook, attached to the bending shoe 228. The bending shoe 228 is formed from a body 232 having an arc shaped channel 234 in a surface thereof. A conduit can be accommodated in the channel 234. The bending shoe 228 may have a single channel 234 or a plurality of side-by-side channels for accommodating conduits of different sizes therein as is known in the art.

In the embodiment as shown, the driver 226 is a hydraulically driven ram which provides rotational force to the bending shoe assembly 224 relative to the frame 222. The driver 226 is mounted to the frame 222 above the bending shoe assembly 224. In an embodiment, the driver 226 includes a hydraulically operated cylinder 236 affixed to the frame 222, a piston within the cylinder 236 and having a piston rod 238 extending from the cylinder 236, and a yoke 240 fixedly attached to a lower end of the piston rod 238. The yoke 240 includes a pair of spaced apart arms which extend downward from the lower end of the piston rod 238.

The body 232 of the bending shoe 228 seats between the arms of the yoke 240. The bending shoe 228 is releasably attached to the yoke 240 by the self-locking pin 20, 120 which extends through the yoke 240 and through the body 232 of the bending shoe 228. The bending shoe 228 can rotate relative to the yoke 240 and the frame 222 around the self-locking pin 20, 120.

The gripping member 230 includes a base having a pair of arms extending therefrom. The base and the arms define a passageway 242 therethrough in which the conduit can seat. The portion of the passageway 242 may be semi-circular.

The body 232 of the bending shoe 228 seats between the arms of the gripping member 230. The passageway 242 faces the channel 234 in the bending shoe 228. The gripping member 230 is releasably attached to the bending shoe 228 by the self-locking pin 20, 120 which extends through the gripping member 230 and through the body 232 of the bending shoe 228. The gripping member 230 can rotate relative to the bending shoe 228 around the self-locking pin 20, 120.

The bending shoe 228 can be easily released from the yoke 240 and the gripping member 230 can be easily released from the bending shoe 228 by releasing the self-locking pin 20, 120 as described herein.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A self-locking pin comprising:
   a shaft having front and rear opposite ends and having a slot therethrough which forms opposite first and second open ends on an outer surface of the shaft, wherein an axis is defined between the first and second open ends of the slot;
   first and second toggles mounted within the slot and movable relative to each other, the first toggle having first and second parallel side surfaces and a first elongated opening therethrough, and the second toggle having first and second parallel side surfaces and a second elongated opening therethrough, each elongated opening having inner and outer opposite ends and parallel front and rear walls;
   a compressible biasing member extending between and engaging the first and second toggles; and
   a mounting pin fixed in position on the shaft and extending through the first and second elongated openings, wherein a centerline of the mounting pin is angled relative to the centerline of the slot such that the side surfaces of the toggles are not parallel to the axis of the slot, and
   wherein the first and second toggles are configured to slide relative to the shaft and to the mounting pin to position the mounting pin toward the inner ends of the first and second elongated openings thereby causing the first and second toggles to partially extend outwardly from the first and second open ends of the slot and to cause the compressible biasing member to expand between the first and second toggles, and
   wherein the first and second toggles are configured to slide relative to the shaft and to the mounting pin to position the mounting pin toward the outer ends of the first and second elongated openings when the first and second toggles are pushed inwardly into the slot and the compressible biasing member compresses between the first and second toggles.

2. The self-locking pin of claim 1, further comprising a handle coupled to the shaft.

3. The self-locking pin of claim 1, further comprising a pair of projections extending outward from the rear end of the shaft.

4. The self-locking pin of claim 1, further comprising an enlarged head at the rear end of the shaft, the enlarged head including a knurled surface.

5. The self-locking pin of claim 1, wherein each toggle has a chamfered surface which is proximate to the front end of the shaft.

6. The self-locking pin of claim 1 in combination with a bender for bending a conduit.

7. The self-locking pin and conduit bender of claim 6, wherein the bender comprises a bending shoe and a saddle, wherein the self-locking pin locks the saddle to the bending shoe.

8. The self-locking pin and conduit bender of claim 6, wherein the bender comprises a bending shoe and a yoke around which the bending shoe is configured to rotate, wherein the self-locking pin locks the bending shoe to the yoke.

9. The self-locking pin of claim 1, wherein the axis is defined by the slot and the centerline of the mounting pin are angled at an angle of 85 degrees.

10. The self-locking pin of claim 1, wherein the axis is defined by the slot and the centerline of the mounting pin are angled between 60 degrees and 85 degrees relative to each other.

11. The self-locking pin of claim 1, wherein a first end of the compressible biasing member engages the first toggle and a second end of the compressible biasing member engages the second toggle, and wherein the first end of the compressible biasing member is vertically offset from the second end of the compressible biasing member.

12. The self-locking pin of claim 11, wherein the compressible biasing member is coil spring or a torsion spring.

13. The self-locking pin of claim 11, wherein the compressible biasing member seats over a protrusion within a pocket in each toggle.

14. The self-locking pin of claim 1, wherein the compressible biasing member is coil spring or a torsion spring.

15. The self-locking pin of claim 1, wherein the compressible biasing member seats over a protrusion within a pocket in each toggle.

16. A self-locking pin comprising:
    a shaft having front and rear opposite ends and having a slot therein which forms an open end on an outer surface of the shaft, wherein an axis is defined through the open end of the slot;
    a single toggle mounted within the slot, the toggle having first and second parallel side surfaces and an elongated opening therethrough, the elongated opening having inner and outer opposite ends and parallel front and rear walls;
    a compressible biasing member extending between and engaging the toggle and the shaft; and
    a mounting pin fixed in position on the shaft and extending through the elongated opening of the toggle, wherein a centerline of the mounting pin is angled relative to the centerline of the slot such that the side surfaces of the toggle are not parallel to the axis of the slot, and
    wherein the toggle is configured to slide relative to the shaft and to the mounting pin to position the mounting pin toward the inner end of the elongated opening thereby causing the toggle to partially extend outwardly from the open end of the slot and to cause the compressible biasing member to expand between the toggle and the shaft, and
    wherein the toggle is configured to slide relative to the shaft and to the mounting pin to position the mounting pin toward the outer end of the elongated opening when the toggle is pushed inwardly into the slot and the compressible biasing member compresses between the toggle and the shaft.

17. The self-locking pin of claim 16, further comprising a pair of projections extending outward from the rear end of the shaft.

18. The self-locking pin of claim 16, further comprising an enlarged head includes at the rear end of the shaft which is spaced from the slot, the enlarged head including a knurled surface.

19. The self-locking pin of claim 16, wherein the toggle has a chamfered surface which is proximate to the front end of the shaft.

20. The self-locking pin of claim 16 in combination with a bender for bending a conduit.

21. The self-locking pin and conduit bender of claim 20, wherein the bender comprises a bending shoe and a saddle, wherein the self-locking pin locks the saddle to the bending shoe.

22. The self-locking pin and conduit bender of claim 20, wherein the bender comprises a bending shoe and a yoke around which the bending shoe is configured to rotate, wherein the self-locking pin locks the bending shoe to the yoke.

23. The self-locking pin of claim 16, wherein the axis is defined by the slot and the centerline of the mounting pin are angled at an angle of 85 degrees.

24. The self-locking pin of claim 16, wherein the axis is defined by the slot and the centerline of the mounting pin are angled between 60 degrees and 85 degrees relative to each other.

25. The self-locking pin of claim 16, wherein the compressible biasing member is coil spring or a torsion spring.

26. The self-locking pin of claim 16, wherein the compressible biasing member seats over a protrusion within a pocket in the toggle.

\* \* \* \* \*